(12) United States Patent
Fujii et al.

(10) Patent No.: US 11,307,816 B2
(45) Date of Patent: Apr. 19, 2022

(54) PRINTING CONTROL APPARATUS, PRINTING SYSTEM, AND INFORMATION PROCESSING APPARATUS TO ENABLE FIRST AND SECOND PRINT SETTINGS

(71) Applicant: CANON KABUSHIKI KAISHA, Tokyo (JP)

(72) Inventors: Yutori Fujii, Yokohama (JP); Yoshitaka Oba, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 50 days.

(21) Appl. No.: 16/685,730

(22) Filed: Nov. 15, 2019

(65) Prior Publication Data

US 2020/0174722 A1 Jun. 4, 2020

(30) Foreign Application Priority Data

Dec. 3, 2018 (JP) .............................. JP2018-226781

(51) Int. Cl.
*G06F 3/12* (2006.01)

(52) U.S. Cl.
CPC .......... *G06F 3/1238* (2013.01); *G06F 3/1206* (2013.01); *G06F 3/1258* (2013.01)

(58) Field of Classification Search
None
See application file for complete search history.

(56) References Cited

U.S. PATENT DOCUMENTS

| 7,034,954 | B1 * | 4/2006 | Utsunomiya | .......... G06K 15/00 358/1.16 |
| 2004/0145973 | A1 * | 7/2004 | Nagashima | ............... G06F 1/14 368/107 |
| 2006/0007469 | A1 * | 1/2006 | Uruma | ............... H04N 1/00477 358/1.14 |
| 2006/0044601 | A1 * | 3/2006 | Misawa | ............. H04N 1/00217 358/1.15 |

FOREIGN PATENT DOCUMENTS

JP 2006-166169 A 6/2006

* cited by examiner

*Primary Examiner* — Mohammad H Ghayour
*Assistant Examiner* — Pawan Dhingra
(74) *Attorney, Agent, or Firm* — Canon U.S.A., Inc. I.P. Division

(57) ABSTRACT

A printing control apparatus that transmits print data including image data and a print setting with respect to the image data to a printing apparatus includes a receiving unit configured to receive a change of the print setting with respect to the image data transmitted to the printing apparatus and a control unit configured to place a restriction that prevents print data based on a first setting value indicating that predetermined identification information is combined with image data when the image data is generated by the printing control apparatus and a second setting value indicating that the image data is stored in the printing apparatus in a re-printable state from being transmitted to the printing apparatus.

17 Claims, 16 Drawing Sheets

JOB PROPERTY

*502* — JOB INFORMATION / MEDIUM / LAYOUT / COLOR / IMAGE / FINISHING / STAMP

*503*

COPY NUMBER PRINTING FUNCTION 1 (FUNCTION OF CONTROLLER)
OFF — *504*

STARTING NUMBER OF COPY NUMBER
1 — *505*

DENSITY OF COPY NUMBER
0.50 — *506*

ANGLE OF COPY NUMBER
0 — *507*

FONT SIZE OF COPY NUMBER
96 — *508*

COPY NUMBER PRINTING FUNCTION 2 (FUNCTION OF APPARATUS)
ON — *512*

STARTING NUMBER OF COPY NUMBER
1 — *513*

*509* OUTPUT  *510* OK  *511* CANCEL

FIG.5B

JOB PROPERTY

JOB INFORMATION / MEDIUM / LAYOUT / COLOR / IMAGE / FINISHING / STAMP

COPY NUMBER PRINTING FUNCTION 1 (FUNCTION OF CONTROLLER)
OFF

*514*

WARNING

THE FOLLOWING SETTINGS CANNOT BE SELECTED SIMULTANEOUSLY.

COPY NUMBER PRINTING FUNCTION 1: ON
COPY NUMBER PRINTING FUNCTION 2: ON

*515* — OK

OUTPUT  OK  CANCEL

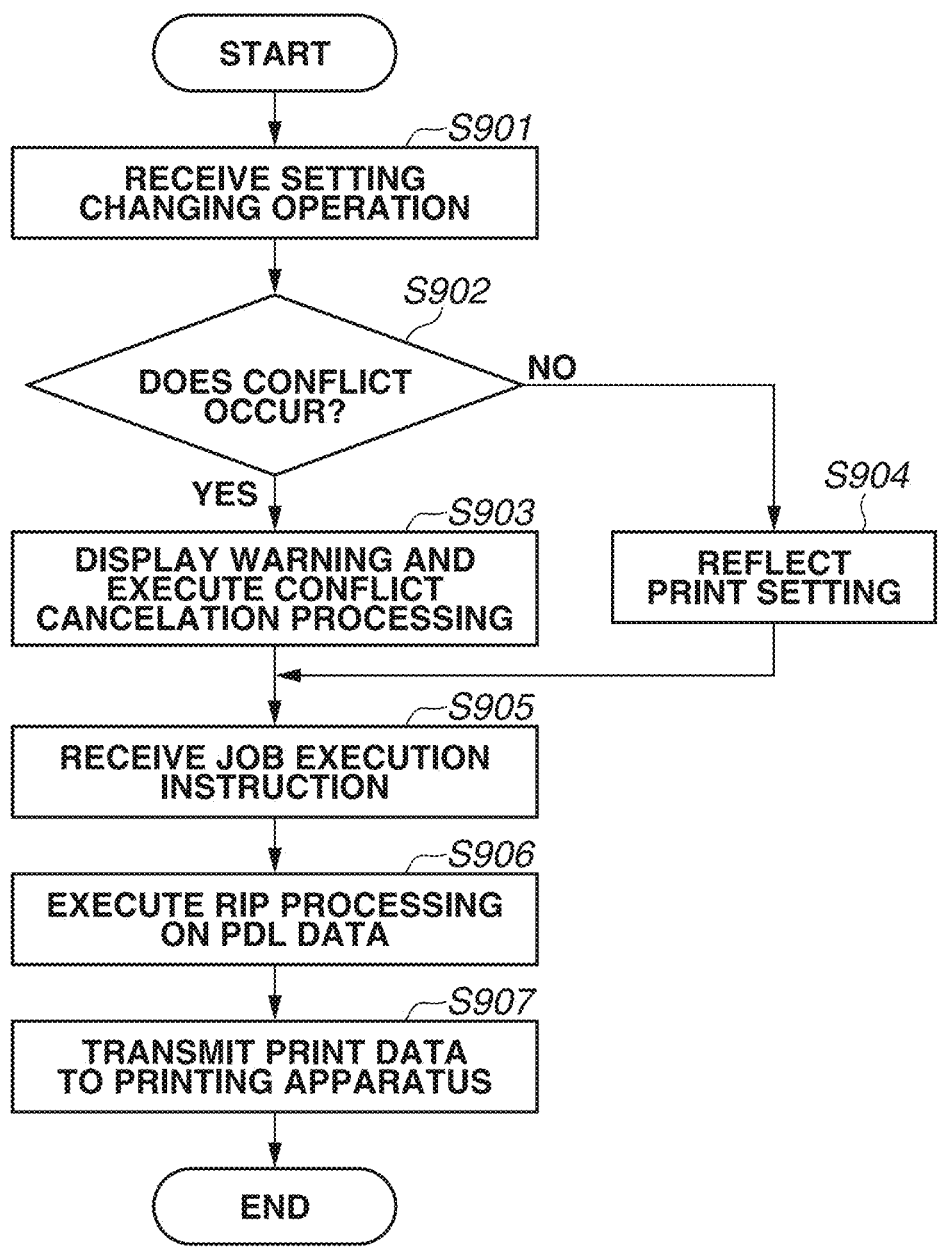

FIG.10

BOX 00

| | JOB NAME | NUMBER OF COPIES | RECEIVING TIME | |
|---|---|---|---|---|
| ☑ | Job1.pdf | 1 COPY | 01/02 03:04 🗝 | —1000 |
| ☐ | Job2.pdf | 1 COPY | 01/02 05:06 | |
| ☐ | Job3.pdf | 1 COPY | 01/02 06:07 | |

☐ SELECT ALL

CHANGE NUMBER OF COPIES
*1006*

DUPLICATE
*1007*

*1008*
PRINT

FIG.15

| | JOB NAME | NUMBER OF COPIES | RECEIVING TIME | |
|---|---|---|---|---|
| ☑ | Job1.pdf | 10 COPIES | 11/12 13:04 | |
| ☐ | Job2.pdf | 5 COPIES | 11/12 15:06 | |
| ☐ | Job3.pdf | 8 COPIES | 11/12 16:07 | |

BOX 00

☐ SELECT ALL

SET COPY NUMBER PRINTING

CHANGE NUMBER OF COPIES

DUPLICATE

PRINT

1/13

PRINTING CONTROL APPARATUS, PRINTING SYSTEM, AND INFORMATION PROCESSING APPARATUS TO ENABLE FIRST AND SECOND PRINT SETTINGS

BACKGROUND OF THE INVENTION

Field of the Invention

The present invention relates to a printing control apparatus, a printing system, and an information processing apparatus.

Description of the Related Art

There has been known a printing apparatus having a function of temporarily storing image data read by a scanner or print data received from an external device in a storage unit such as a hard disk included in the printing apparatus and executing printing by reading out any image data or print data from that storage unit. The storage unit is referred to as a box or a private mail box, and can store data used for printing and settings relating to printing of that data in association with each other. For example, a setting of post-processing (e.g., finishing processing such as stapling, folding, or bookbinding), and a print setting such as image imposition and the number of copies that are applied when printing is executed can be stored in association with the image data.

A copy number printing function has been known as a function for improving distinguishability of printed materials. The copy number printing function is a function of printing a copy number on each of the printed materials when a plurality of copies of a document is printed. If three copies of a document are printed by using the copy number printing function, for example, pieces of information such as "0001", "0002, and "0003" for identifying the three copies are respectively added to an output document as the first copy, an output document as the second copy, and an output document as the third copy. The function is used to manage documents, for example, when a user prints a plurality of copies of a highly confidential document and distributes the copies of the document to participants in a conference. By using the copy number printing function, even if a distributed copy is copied by an unauthorized user, it is possible to track which of the copies of the document distributed to which participant has been copied.

Further, there has been known a technique for performing data management in view of security when print data to which the copy number printing function is set is stored in a storage area such as a box or a private mail box. For example, when print data to which the copy number printing function is set is stored in a box, an image processing apparatus discussed in Japanese Patent Application Laid-Open No. 2006-166169 records the total number of copies of the stored print data. Further, if the image processing apparatus determines that the total number of copies has reached an upper limit thereof, the print data is deleted from the box.

There is also known a printing system that generates image data used for printing by using a printing control apparatus, and prints the image data by transmitting the image data to a printing apparatus. In the printing system configured as the above, copy number printing for identifying a printed material is to be implemented when the image data is generated by the printing control apparatus.

Herein, a security issue occurs if image data on which an image for printing a copy number is superimposed by the printing control apparatus is simply stored in the box of the printing apparatus. For example, if a user duplicates image data with copy number printing stored in the box and executes printing, two sets of printed materials of the same content having the same copy number exist, and the printed materials cannot be distinguished from each other. Furthermore, if the user changes the number of copies of the image data with copy number printing stored in the box, and provides a printing instruction, two sets of printed materials of the same content having the same copy number can exist, and the printed materials cannot be distinguished from each other. Further, the printing apparatus can only recognize the image data on which an image for printing the copy number is superimposed merely as image data including a pattern indicating the copy number. Accordingly, it will be difficult to use a method discussed in Japanese Patent Application Laid-Open No. 2006-166169.

SUMMARY OF THE INVENTION

According to an aspect of the present invention, a printing control apparatus that transmits print data including image data and a print setting with respect to the image data to a printing apparatus includes a receiving unit configured to receive a change of the print setting with respect to the image data transmitted to the printing apparatus and a control unit configured to place a restriction that prevents print data based on a first setting value indicating that predetermined identification information is combined with image data when the image data is generated by the printing control apparatus and a second setting value indicating that the image data is stored in the printing apparatus in a re-printable state from being transmitted to the printing apparatus.

Further features of the present invention will become apparent from the following description of exemplary embodiments with reference to the attached drawings.

BRIEF DESCRIPTION OF THE DRAWINGS

FIGS. 5A and 5B are diagrams illustrating examples of a screen displayed on a display unit of the printing control apparatus.

FIG. 9 is a flowchart illustrating an example of control executed by the printing control apparatus.

FIG. 10 is a diagram illustrating an example of a screen displayed on an operation unit of the printing apparatus.

FIG. 15 is a diagram illustrating an example of a screen displayed on an operation unit of the printing apparatus.

DESCRIPTION OF THE EMBODIMENTS

Exemplary embodiments of the present invention will be described below with reference to the appended drawings. The embodiments described below are not intended to limit the scope of the present invention described in the appended claims, and not all of the combinations of features described in the exemplary embodiments are required as solutions in the present invention.

Figure 1:
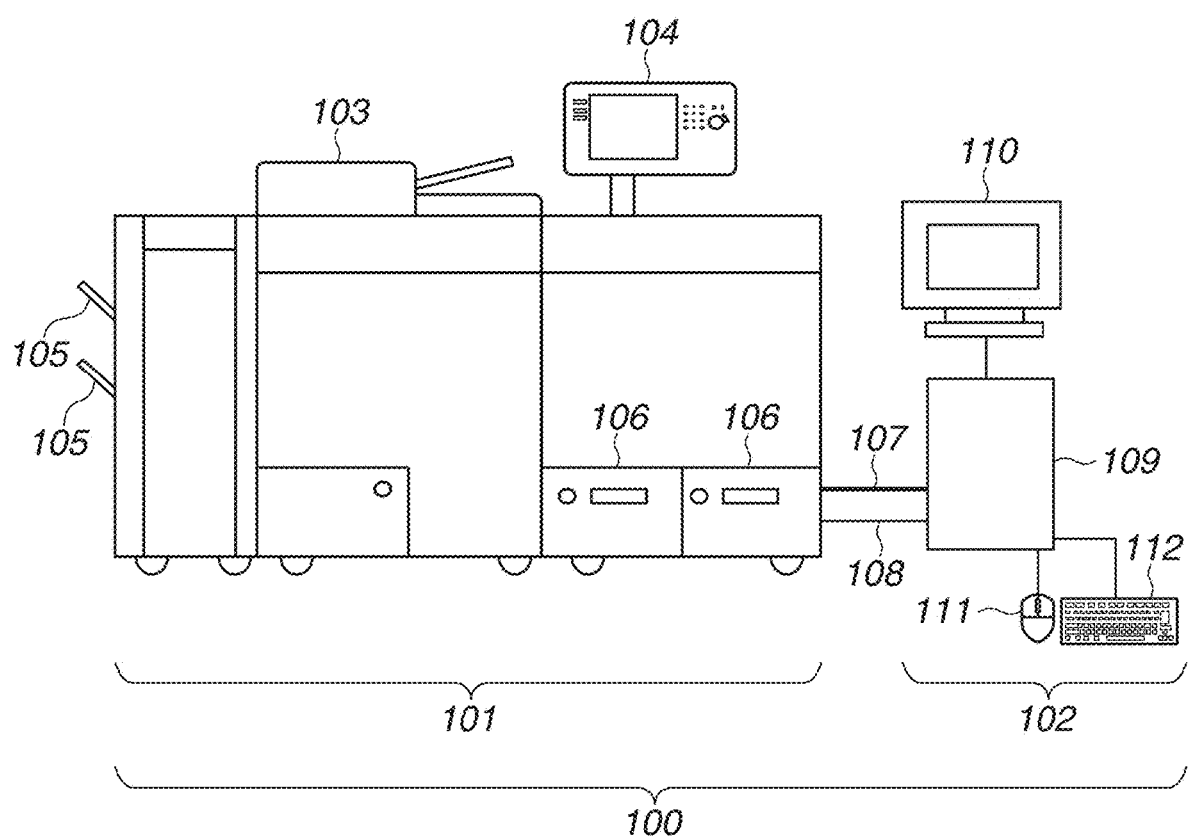
FIG. 1 is a diagram illustrating an example of a printing system.

FIG. 1 is a diagram schematically illustrating an entire configuration of a printing system 100 according to a first exemplary embodiment. The printing system 100 includes a printing apparatus 101 and a printing control apparatus 102. The printing apparatus 101 and the printing control apparatus 102 are connected with each other via a video cable 107 and a local area network (LAN) cable 108. The printing apparatus 101 is a multifunction peripheral having various functions. The printing apparatus 101 can transmit an image read by a reading unit 103, execute printing based on print data received from the printing control apparatus 102 or a computer (not illustrated), and temporarily store print data. The image data that is temporarily stored can be printed by a user operation performed via an operation unit 104. A sheet used in printing is stored in a sheet feeding unit 106. The printing apparatus 101 conveys the sheet stored in the sheet feeding unit 106 to a printing unit 214 described below, and prints an image on the conveyed sheet. The sheet on which the image is printed (printed material) is discharged to a sheet discharge unit 105 serving as a discharge tray.

Next, the printing control apparatus 102 will be described. The printing control apparatus 102 is a printing controller which executes image processing in cooperation with the printing apparatus 101. The printing control apparatus 102 includes a function of receiving a print job described in a page description language (PDL) from a personal computer (PC) (not illustrated) or a tablet terminal (not illustrated) and temporarily storing the print job in a storage area. Further, the printing control apparatus 102 has a function of analyzing the print job described in the PDL, converting the print job into image data, and transmitting the converted image data to the printing apparatus 101. The converted image data is transmitted to and printed by the printing apparatus 101. The printing control apparatus 102 includes a controller 109 serving as a main control unit, a display apparatus 110 such as a liquid crystal display monitor, a pointing device 111, and a keyboard 112. In the present exemplary embodiment, the printing system 100 including the printing control apparatus 102 and the printing apparatus 101 connected to each other by the LAN cable 108 and the video cable 107 will be described. However, the configuration of the printing system 100 is not limited thereto. For example, the printing apparatus 101 may have functions of the printing control apparatus 102. Further, the display apparatus 110 may have a function of a position input apparatus such as a touch-pad and may concurrently function as the pointing device 111.

<Configuration of Printing Apparatus 101>

Figure 2A:
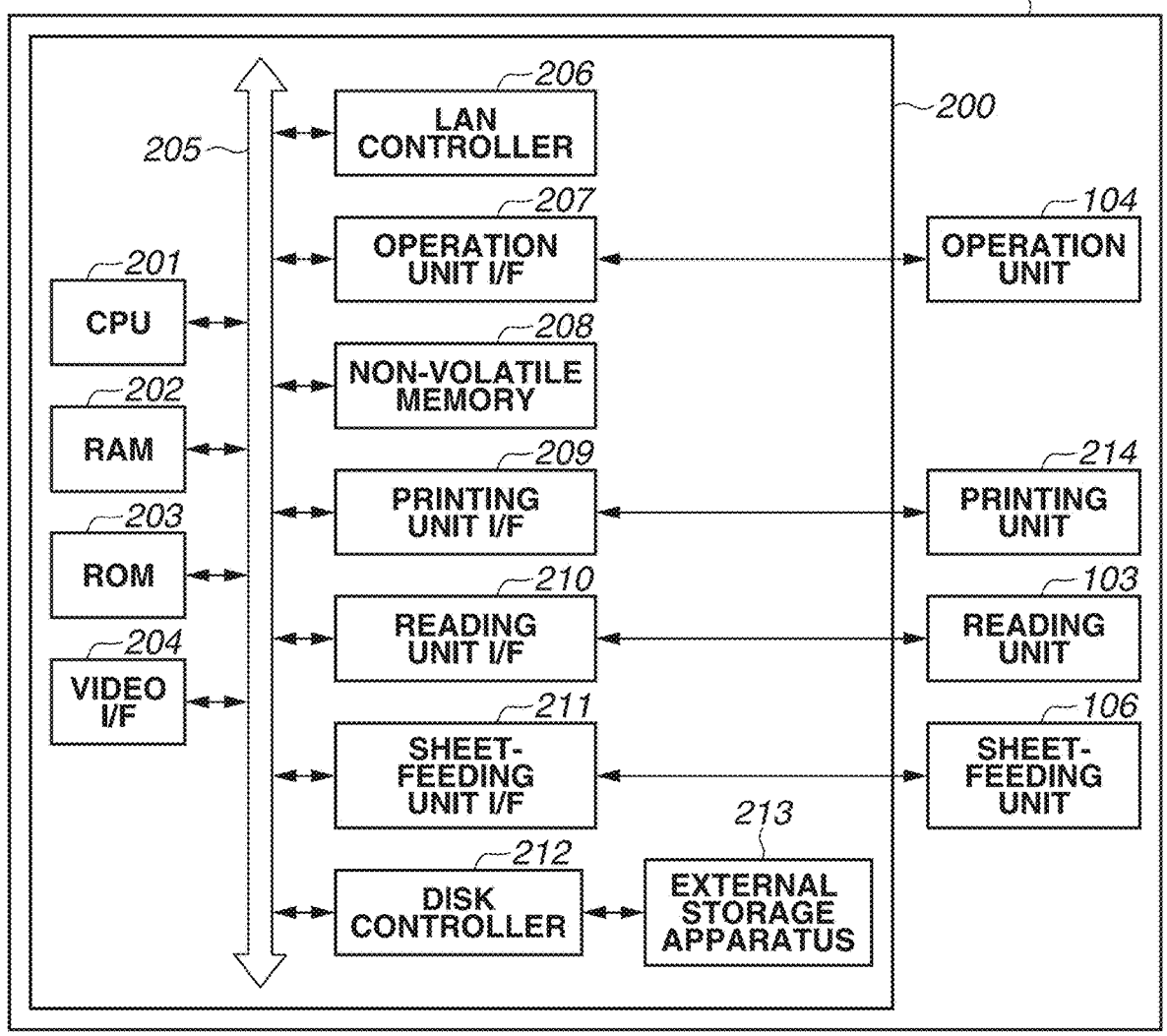
FIGS. 2A and 2B are block diagrams illustrating configuration examples of a printing apparatus.
Figure 2B:
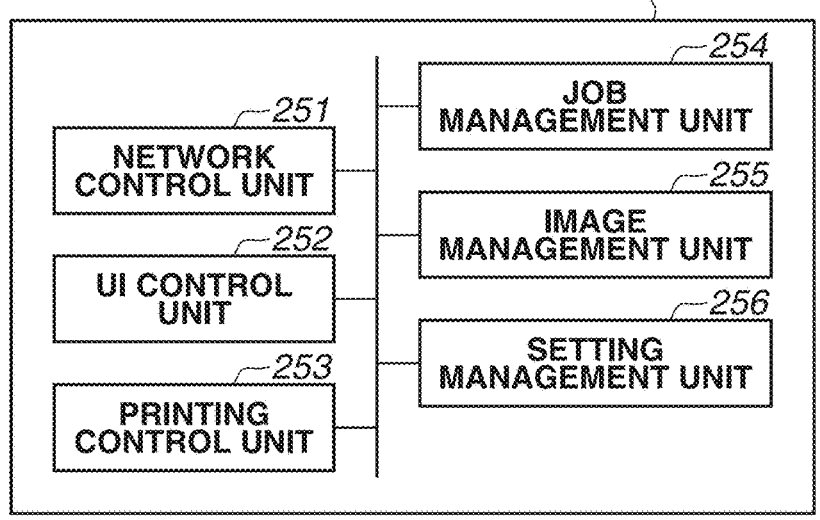

Subsequently, a configuration of the printing apparatus 101 will be described with reference to FIGS. 2A and 2B. FIG. 2A is a block diagram illustrating an example of a hardware configuration of the printing apparatus 101 according to the present exemplary embodiment. FIG. 2B is a block diagram illustrating an example of a software configuration of the printing apparatus 101 according to the present exemplary embodiment.

A controller 200 that includes a central processing unit (CPU) 201 controls operation of the entire printing apparatus 101. The CPU 201 generally controls interfaces (I/F) and units connected to a system bus 205 based on a control program stored in a read only memory (ROM) 203 or an external storage apparatus 213.

A random access memory (RAM) 202 mainly functions as a main memory or a work area of the CPU 201. The ROM 203 functions as a temporary storage area and a work memory when the printing apparatus 101 is in operation. A video I/F 204 receives image data from the printing control apparatus 102. A LAN controller 206 enables the CPU 201 to communicate with the printing control apparatus 102. An operation unit I/F 207 connects the operation unit 104 to the controller 200. The operation unit 104 functions as a receiving unit for receiving a user operation and a display unit for displaying information for a user. A non-volatile memory 208 stores various types of setting information such as an operation mode of the printing apparatus 101. The setting information stored in the non-volatile memory 208 can be changed by a user operation performed via the operation unit 104 or a web screen (not illustrated).

A printing unit I/F 209 connects the printing unit 214 to the controller 200. The printing unit 214 prints an image on a sheet conveyed from the sheet feeding unit 106 based on an image signal received from the controller 200. Further, a reading unit I/F 210 connects the reading unit 103 to the controller 200. The reading unit 103 reads a document placed on a document placing unit to acquire an image, and transfers the acquired image to the controller 200 via the reading unit I/F 210. The controller 200 stores the transferred image in the RAM 202. The stored image is used for printing or data transmission. A sheet feeding unit I/F 211 is an interface for acquiring information about the sheet feeding unit 106 from the controller 200. The sheet feeding unit I/F 211 notifies the controller 200 of an opening-closing state and a sheet stacking state of the sheet feeding unit 106 based on an output result of a sensor (not illustrated). The controller 200 executes control such as sheet replenishment processing of the printing apparatus 101 based on the notification.

A disk controller 212 controls access to the external storage apparatus 213. The external storage apparatus 213 is a hard disk drive or a solid state drive (SSD), and its use will be described below with reference to FIG. 3.

An example of the software configuration of the printing apparatus 101 will be described with reference to FIG. 2B. Each module constituting system software 250 is loaded into the RAM 202 and executed by the CPU 201.

A network control unit 251 controls, for example, communication performed between the CPU 201 and the printing control apparatus 102 via the LAN controller 206. A user interface (UI) control unit 252 controls the operation unit 104 via the operation unit I/F 207 to detect a user operation performed through the operation unit 104 and to display information on the operation unit 104. A printing control unit 253 transmits a job to the printing unit 214 via the printing unit I/F 209. A job management unit 254 receives a job and monitors a job status via the LAN controller 206. An image management unit 255 receives image data generated by the printing control apparatus 102 from the job management unit 254 and transfers the received image data to the printing control unit 253. A setting management unit 256 provides a function of referring to or changing a print setting of a print job stored in the printing apparatus 101.

The printing apparatus 101 according to the present exemplary embodiment has a copy number printing function in which a copy number for identifying a printed material is combined with print data when printing is executed. In order to distinguish the copy number printing function provided by the printing apparatus 101 when printing is executed from the copy number printing function provided by the printing control apparatus 102 described below, the copy number printing function provided by the printing control apparatus 102 is referred to as a copy number printing function 1 or a copy number printing function provided by a controller. The copy number printing function provided by the printing apparatus 101 is referred to as a copy number printing function 2 or a copy number printing function provided by the apparatus.

The printing apparatus 101 of the present exemplary embodiment also has a function of temporarily storing image data based on a received print job or scanned image data in a storage area, reading out any image data or print data from a storage unit, and printing the read image data or print data. Hereinafter, this function is referred to as a box function or a box printing function. The box function is an example of a function of storing image data in the printing apparatus 101 in a re-printable state.

In a case where a print job to which the copy number printing function provided by the apparatus is set is to be printed, the image management unit 255 superimposes a rendering object, which illustrates a character string of a copy number generated from a setting value of the copy number, on the image data to be printed, so that the copy number is printed thereon.

As described above, through the copy number printing function provided by the apparatus, a copy number is superimposed on the image data to be printed at a timing when printing is executed. Accordingly, even if the print data is temporarily stored in a box area where the print data is stored in the re-printable state based on a user instruction, the user can operate the operation unit 104 to flexibly change a starting number of the copy number and a layout or a size of the copy number. Thus, in the present exemplary embodiment, the user is allowed to store a print job to which the copy number printing function provided by the apparatus is set in the box area of the printing apparatus 101.

Figure 3:
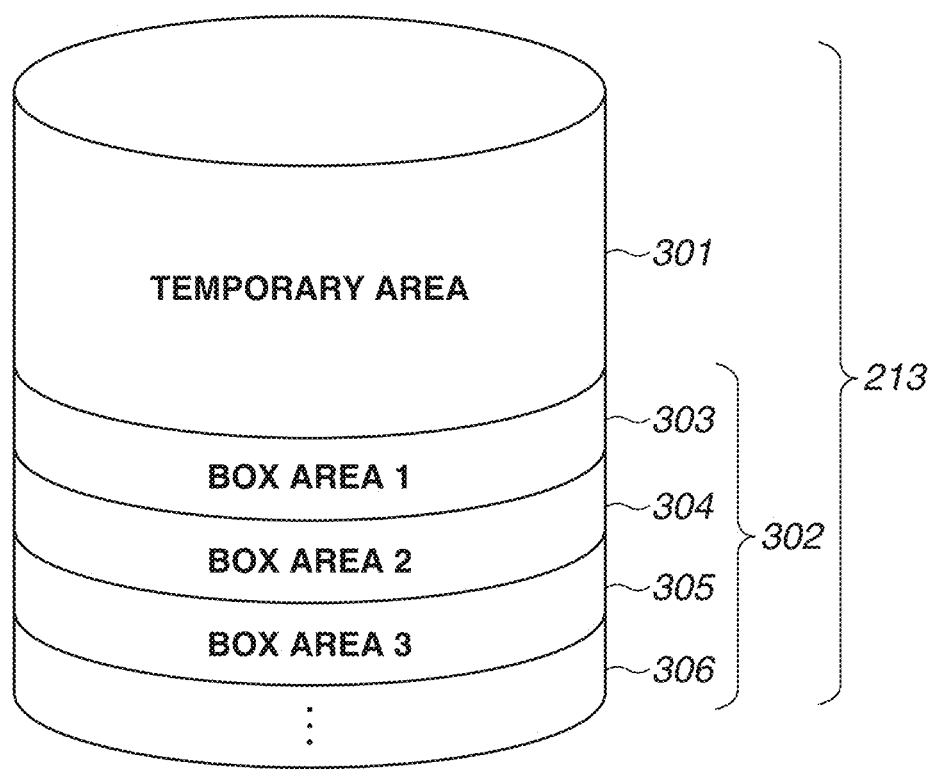
FIG. 3 is a diagram illustrating an example of a storage area for storing print data in a re-printable state.

A box area where a print job and image data are stored in the re-printable state will be described with reference to FIG. 3. FIG. 3 is a diagram illustrating an example of the storage area included in the printing apparatus 101 of the present exemplary embodiment. In the present exemplary embodiment, a storage area of the external storage apparatus 213 is logically divided into a temporary area 301 and a box area 302. The temporary area 301 is a storage area where data is temporarily stored to change order of output of the image data. The box area 302 is a storage area for using the box function. The box area 302 is divided into a registered number of storage areas such as box areas 303 to 306. A folder name can be set to each of the box areas 303 to 306. Image data read by the reading unit 103 and image data which the printing control apparatus 102 instructs the printing apparatus 101 to store in a specific box are stored in the box areas 303 to 306. By specifying the folder name via a box function screen displayed on the operation unit 104, the user can change a print setting or provide a printing instruction with respect to the image data stored in the corresponding box area, <Configuration of Printing Control Apparatus 102>

Figure 4A:
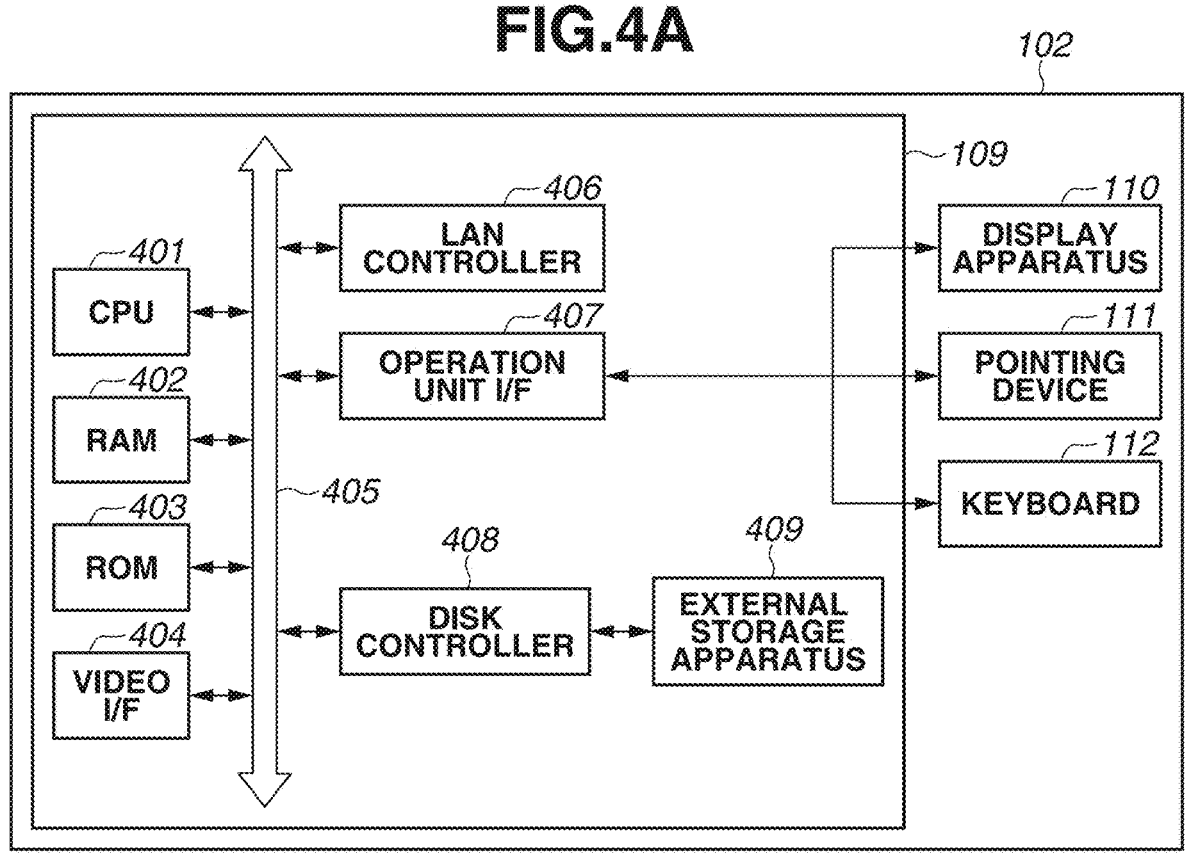
FIGS. 4A and 4B are block diagrams illustrating configuration examples of a printing control apparatus.
Figure 4B:
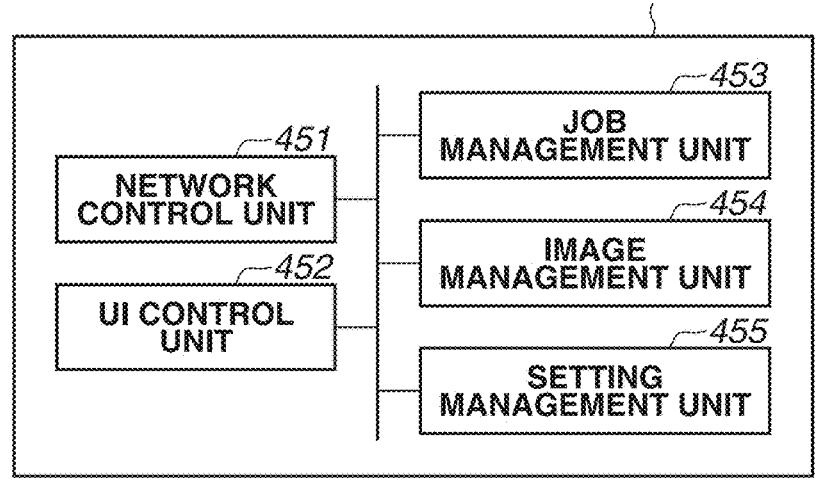

A configuration example of the printing control apparatus 102 will be described with reference to FIGS. 4A and 4B. FIG. 4A is a block diagram illustrating an example of a hardware configuration of the printing control apparatus 102 according to the present exemplary embodiment. FIG. 4B is a block diagram illustrating an example of a software configuration of the printing control apparatus 102 according to the present exemplary embodiment. The controller 109 that includes a CPU 401 controls operation of the entire printing control apparatus 102. The CPU 401 generally controls interfaces and units connected to a system bus 405 based on a control program stored in a ROM 403 or an external storage apparatus 409. A RAM 402 mainly functions as a main memory or a work area of the CPU 401. The ROM 403 functions as a temporary storage area and a work memory when the printing control apparatus 102 is in operation. A video I/F 404 is an interface through which image data that has been processed by raster image processor (RIP) is transmitted to the printing apparatus 101. A LAN controller 406 is an interface through which the CPU 401 communicates with the printing apparatus 101. The LAN controller 406 also functions as an interface for receiving a print job from an information processing apparatus such as a PC (not illustrated).

An operation unit I/F 407 connects the display apparatus 110, the pointing device 111, and the keyboard 112 to the controller 109. The controller 109 controls display of information on the display apparatus 110 via the operation unit 407. The controller 109 also detects a user operation performed via the pointing device 111 or the keyboard 112, and receives a user instruction such as an instruction to change various print settings or an instruction to print.

A disk controller 408 controls access to the external storage apparatus 409 such as a hard disk. The external storage apparatus 409 stores a print setting and temporarily stores a job. The external storage apparatus 409 is also used as a job storage area where the stored job is stored again after the RIP processing is executed thereon.

An example of the software configuration of the printing control apparatus 102 will be described with reference to FIG. 4B. Each software module constituting system software 450 is loaded into the RAM 402 of the printing control apparatus 102 and executed by the CPU 401.

A network control unit 451 controls, for example, communication performed between the CPU 401 and the printing apparatus 101 via the LAN controller 406. A UI control unit 452 detects, via the operation unit 407, a user operation performed using the pointing device 111 or the keyboard 112 and displays information on the display apparatus 110. A job management unit 453 transmits a job to the printing apparatus 101 and monitors a job status. A setting management unit 455 manages a print setting of a job made via the pointing device 111 or the keyboard 112.

Similar to the printing apparatus 101, the printing control apparatus 102 has a copy number printing function 1 (copy number printing function by the controller) in which a copy number for identifying a printed material is added to image data when the image data is generated by the printing control apparatus 102. The user can enable the copy number printing function 1 through a setting screen displayed on the display apparatus 110 of the printing control apparatus 102.

Next, based on the print setting set by the setting management unit 455, an image management unit 454 executes the RIP processing on PDL data received from the job management unit 453, and returns the generated image data to the job management unit 453. In a case where the copy number printing function 1 is enabled as the print setting, the processing of superimposing an identification image for identifying a copy number on the image acquired by analyzing the PDL is also to be executed by the image management unit 454.

There is a security issue if the image data, to which a copy number is set by using the copy number printing function 1, which is the copy number printing function provided by the controller, is simply stored in the box area 302 of the printing apparatus 101 illustrated in FIG. 3. More specifically, if the user duplicates the image data with copy number printing stored in the box area and executes printing, two or more sets of printed materials having the same copy number are output, whereby the user cannot identify the printed materials. Further, if the user changes the number of copies of the image data with the copy number printing stored in the box area and provides a printing instruction thereof, two or more sets of printed materials having the same copy number are output, whereby the user cannot identify each of the printed materials.

In consideration of at least one of the above-described issues, the present exemplary embodiment is directed to a control method of preventing image data having the copy number set by the controller 109 from being stored in the storage area of the printing apparatus 101. Hereinafter, the control method will be described more specifically.

First, setting methods of the copy number printing functions 1 and 2 will be described with reference to FIGS. 5A and 5B. FIG. 5A is a diagram illustrating an example of a setting screen relating to the copy number printing functions displayed on the display apparatus 110 of the printing control apparatus 102. FIG. 5B is a diagram illustrating an example of a notification screen displayed on the display apparatus 110 of the printing control apparatus 102.

A screen 500 in FIG. 5A is a window which allows a user to make a print setting with respect to any job via the display apparatus 110. A button 501 enables the user to make a simple change in a display format of the window, i.e., closing, enlarging, reducing, and hiding the screen 500. A setting item list 502 is a menu for transitioning to a setting item, and the setting item such as job information or stamp can be selected therefrom. An area 503 illustrates a list of settings displayed when the user selects the setting item stamp from the setting item list 502. The user can make various print settings with respect to the copy number by selecting the item displayed in the area 503. A setting 504 is a combo box for making a setting of the copy number printing function 1, and the user can select between ON and OFF (enable or disable) of the copy number printing function 1. Setting items 505 to 508 are combo boxes for making various settings relating to the copy number printing function 1 in a case where the setting 504 of the copy number printing function 1 is enabled. A starting number of copy number of the copy number printing function 1 can be set by the setting item 505. A density of the copy number printing function 1 can be set by the setting item 506. A printing angle of the copy number printing function 1 can be set by the setting item 507. A font size of the copy number printing function 1 can be set by the setting item 508.

A button 509 is an output start button if the output start button 509 is selected, a print setting set via the screen 500 and print data including the image data generated by the printing control apparatus 102 are transmitted to the printing apparatus 101. A button 510 is an OK button if selection of the OK button 510 is detected, the printing control apparatus 102 stores, in the external storage apparatus 409, the print setting selected on the screen 500 in association with the print data that is a printing target. A button 511 is a cancel button. If selection of the cancel button 511 is detected, the printing control apparatus 102 closes the screen 500 without applying the print setting selected on the screen 500 to the print data that is the printing target.

A setting item 512 is a combo box for setting the copy number printing function 2, which is the copy number printing function provided by the apparatus, and the user can select between ON and OFF (enable or disable) of the copy number printing function 2. A setting item 513 is a combo box for making various settings relating to the copy number printing function 2. A starting number of copy number of the copy number printing function 2 can be set by the setting item 513. Detailed settings of the copy number printing function 2 can be made on the operation unit 104 of the printing apparatus 101. For example, a density, a superimposing position, and a font size of the copy number printing function 2 can be set thereon.

If selection of the output start button 509 is detected, the printing control apparatus 102 transmits a print job (print data) including the print setting set via the screen 500 and image data to the printing apparatus 101. More specifically, if the UI control unit 452 detects selection of the output start button 509, the job management unit 453 transmits the print job to the printing apparatus 101. The printing apparatus 101 receives the print job from the printing control apparatus 102 via the video cable 107 and the LAN cable 108. Transmission of a job generation request and a print setting, reception and transmission of a status, and reception and transmission of a job end notification are executed via the LAN cable 108. When the printing apparatus 101 is ready to receive the image data, the image data is transmitted via the video cable 107. In other words, in the present exemplary embodiment, among the data constituting the print job, the image data is transmitted via the video cable 107, and the print setting is transmitted via the LAN cable 108. However, a configuration of print job transmission is not limited thereto. For example, the image data and the print setting may be transmitted via the LAN cable 108 without using the video cable 107.

In the present exemplary embodiment, processing for preventing both of the copy number printing functions 1 and 2 from being enabled is executed. More specifically, if a user operation for enabling the copy number printing function 2 is detected in a state where the setting of the copy number printing function 1 has already been enabled, the printing control apparatus 102 displays a notification screen illustrated FIG. 5B. Similarly, if a user operation for enabling the copy number printing function 1 is detected in a state where the setting of the copy number printing function 2 has already been enabled, the printing control apparatus 102 displays a notification screen illustrated FIG. 5B.

A pop-up screen 514 displays a warning of a conflict that occurs in the setting. The pop-up screen 514 displays information indicating that the copy number printing functions 1 and 2 cannot be used in combination. A button 515 is an OK button. If selection of the OK button 515 is detected, the printing control apparatus 102 closes the pop-up screen 514 and cancels the setting made by the last user operation. In the present exemplary embodiment, a print setting value that is set earlier is prioritized. However, the configuration is not limited thereto. For example, a print setting value that is most recently specified by the user may be prioritized. Further, the print setting that is most recently specified by the user may be prioritized without displaying the warning on the pop-up screen 514. For example, in a case where an instruction for enabling the setting value of the copy number printing function 2 is received in a state where the setting value of the copy number printing function 1 is enabled, the printing control apparatus 102 may enable the setting value of the copy number printing function 2 while changing the setting value of the copy number printing function 1 to be disabled.

Figure 6:
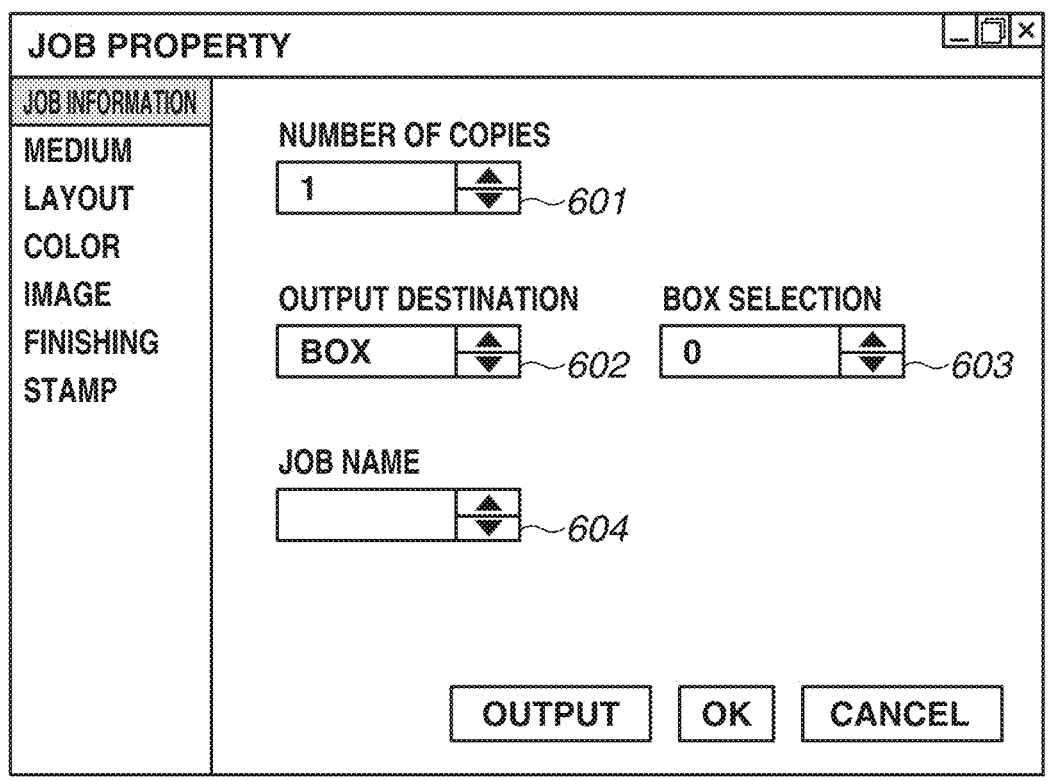
FIG. 6 is a diagram illustrating an example of a screen displayed on the display unit of the printing control apparatus.

Next, an example of a print setting for storing image data in the printing apparatus 101 in a re-printable state will be described. FIG. 6 is a diagram illustrating an example of a setting screen of a store-in-box function. FIG. 6 illustrates an example of a screen displayed when the setting item "job information" is selected from the setting item list 502. The user can make a setting relating to a job output thereon. The number of copies 601 is a combo box for setting the number of copies to print, and a value of one or more can be selected from or input to the number of copies 601. An output destination 602 is a combo box for setting an output destination, and a box or a printer can be selected as the output destination. If an operation (printing instruction) for starting output is received in a state where the box is selected as the output destination 602, the printing control apparatus 102 transmits a print job to the printing apparatus 101.

If the printing apparatus 101 determines that the box is set as the output destination 602 included in the print setting of the job received from the printing control apparatus 102, the printing apparatus 101 stores the received job in the box area 302 of the external storage apparatus 213.

Referring back to the description of FIG. 6. A box selection 603 is a combo box for selecting the box as a storage destination. The user can select a box to store the job when the box is set as the output destination 602. Boxes selectable from the box selection 603 corresponds to the box areas 303 to 306. A job name 604 is a text box for receiving an input of a name of a job to be stored in the box.

Figure 7:
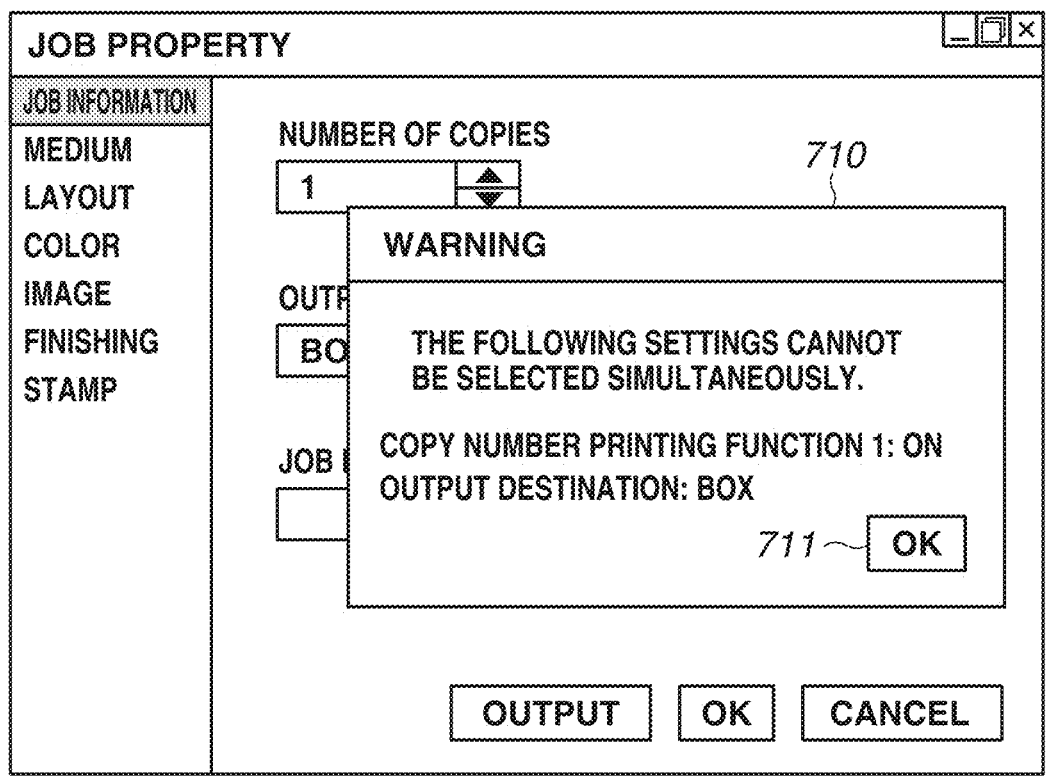
FIG. 7 is a diagram illustrating an example of a screen displayed on the display unit of the printing control apparatus.

In the present exemplary embodiment, the printing control apparatus 102 executes processing for preventing the user from using the copy number printing function 1 in combination with the setting for using the box as the output destination. More specifically, if a user operation for selecting the box as the output destination is detected in a state where the setting of the copy number printing function 1 has already been enabled, the printing control apparatus 102 displays a notification screen as illustrated in FIG. 7. Similarly, if a user operation for enabling the copy number printing function 1 is received in a state where the box has already been set as the output destination, the printing control apparatus 102 displays the notification screen as illustrated in FIG. 7.

As illustrated in FIG. 7, a notification screen 710 for notifying the user that the copy number printing function 1 of the printing control apparatus 102 and the store-in-box function cannot be used in combination is displayed thereon. A button 711 is an OK button.

If selection of the OK button 711 is detected, the printing control apparatus 102 closes the notification screen 710 and cancels the setting made by the most recent user operation. In the present exemplary embodiment, a print setting value that is set earlier is prioritized. However, the configuration is not limited thereto. For example, a print setting value that is most recently specified by the user may be prioritized. Further, the print setting that is most recently specified by the user may be prioritized without displaying a warning on the pop-up screen. In this case, for example, if an instruction for selecting the box as the output destination is received in a state where the setting value of the copy number printing function 1 is enabled, the printing control apparatus 102 may set the box as the output destination while changing the setting value of the copy number printing function 1 to be disabled.

Figure 8A:
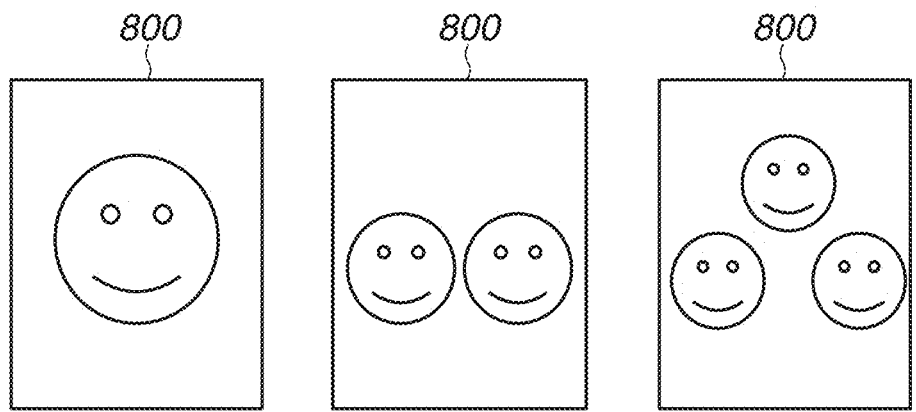
FIGS. 8A and 8B are diagrams illustrating examples of image data on which an image of a copy number is superimposed.
Figure 8B:
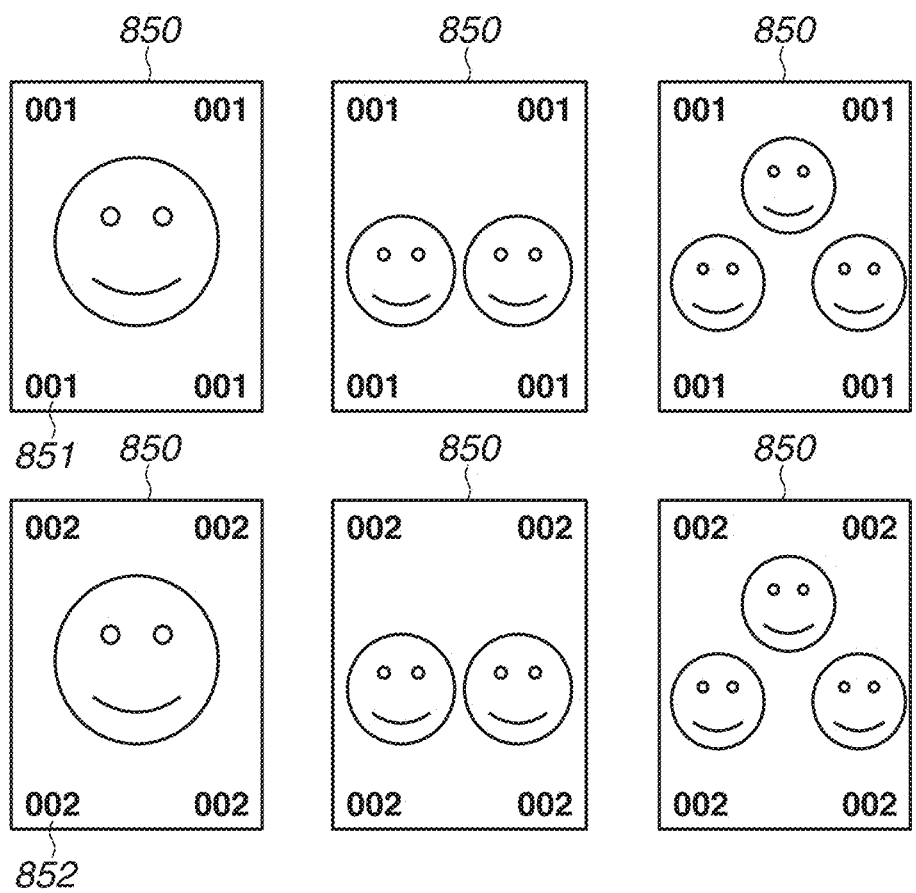

FIGS. 8A and 8B are diagrams illustrating printing results of a normal job according to the present exemplary embodiment. Printed materials 800 in FIG. 8A illustrate an example of a printing result of a job of three pages acquired when the setting value of the copy number printing function 1 is disabled, and the setting value of the number of copies is set to 1. Printed materials 850 in FIG. 8B illustrate an example of a printing result acquired when the setting value of the copy number printing function 1 is enabled, and the setting value of the number of copies is set to 2. A copy number 851 indicates that it is a printing result of a first copy. Copy number printing based on the starting number set by the setting item 505, such as "001", is combined with content of the printed materials 800. A copy number 852 is a copy number of the second copy, and is a number subsequent to the copy number 851.

The printing control apparatus 102 generates rendering objects illustrating character strings of the copy numbers 851 and 852 based on the settings of the angle, the density, and the font size of the copy numbers 851 and 852 specified via the setting items 505 to 508 in the screen 500. Next, the printing control apparatus 102 superimposes the rendering objects illustrating the character strings of the copy numbers 851 and 852 on PDL data and converts the PDL data into image data. Based on a setting of the output destination 602, the job management unit 453 transmits the image data that has been processed by the RIP to the printing apparatus 101. At this time, the printing apparatus 101 that has received the job recognizes that image data consisting of 6 pages and for one copy is received. In the present exemplary embodiment, a case is cited where a rendering object illustrating a character string of a copy number is combined before execution of the RIP processing. However, the present exemplary embodiment is not limited thereto. For example, similar to the copy number printing function provided by the printing apparatus 101, the PDL data of an image to be printed is processed by the RIP, and the image data acquired by the RIP processing may be combined with the image data illustrating the character string of the copy number.

FIG. 9 is a flowchart illustrating an example of print setting control executed by the printing control apparatus 102 of the present exemplary embodiment. Processing illustrated in the flowchart in FIG. 9 is implemented by the CPU 401 reading out a program of each software component stored in the external storage apparatus 409 to the RAM 402 and executing the program. Hereinafter, to clarify the component that executes the processing, the processing will be described by using a name of the component as a subject.

In step S901, the UI control unit 452 receives an operation for changing a print setting from the user via the screen 500.

In step S902, the setting management unit 455 determines whether a conflict occurs in the print setting if the print setting requested to be changed in step S901 is combined with the existing print setting. If the conflict occurs in the print setting (YES in step S902), the processing proceeds to step S903. If the conflict does not occur in the print setting (NO in step S902), the processing proceeds to step S904. The determination processing will be described more specifically. The setting management unit 455 acquires a conflict rule describing a combination of print setting values conflicting with each other stored in the storage area of the printing control apparatus 102. Subsequently, the setting management unit 455 determines whether a setting value group obtained by combining the print setting value received as a result of the user operation with the value of the current print setting corresponds to the acquired conflict rule. If the setting management unit 455 determines that the setting value group corresponds to the acquired conflict rule, the processing proceeds to step S903. If the setting management unit 455 determines that the setting value group does not correspond to the acquired conflict rule, the processing proceeds to step S904. The conflict rule includes a combination condition in which both of the setting values of the copy number printing functions 1 and 2 are enabled, and a combination condition in which the setting value of the copy number printing function 1 is enabled and the box is specified as the output destination. In addition, a condition that prohibits a combination of a predetermined type of post-processing and a predetermined sheet size or sheet type is also included. However, a combination of the copy number printing function 2, which is the copy number printing function provided by the apparatus, and specification of the box as the output destination is not included as the conflicting combination condition.

A specific example will be described. In a case where the user operation for enabling the setting value of the copy number printing function 1 is received in step S901, if the box has already been selected as the output destination in the print setting for the image data, the setting management unit 455 determines that the print setting corresponds to the conflict rule. In a case where a user operation for selecting the box as the output destination is received, if the setting value of the copy number printing function 1 has already been enabled, the setting management unit 455 determines that the print setting corresponds to the conflict rule.

In a case where a print setting operation for setting a sheet-folding setting to a half fold is received in step S901, if a post card has already been specified in the sheet setting of the existing print setting, the setting management unit 455 determines that the print setting corresponds to the conflict rule. In a case where a print setting changing operation that enables the copy number printing function 1 is received in step S901, if the setting value of the copy number printing function 2 has already been enabled, the setting management unit 455 determines that the print setting corresponds to the conflict rule. Furthermore, in a case where the print setting changing operation that enables the copy number printing function 2 is received in step S901, if the setting value of the copy number printing function 1 has already been enabled, the setting management unit 455 determines that the print setting corresponds to the conflict rule.

An example of a combination that does not correspond to the conflict rule will be described. As described above, a combination of the copy number printing function 2 and the specification of the box does not correspond to the conflict rule. Accordingly, the user is allowed to change the setting value of the copy number printing function 2 to be enabled in a state where the box is selected as the output destination.

Next, in step S903, in cooperation with the display apparatus 110, the setting management unit 455 displays a warning indicating that print settings conflicting with each other have been determined on the display apparatus 110.

FIG. 7 is a diagram illustrating an example of a screen displaying the warning. If selection of the OK button 711 is detected via the warning screen, the setting management unit 455 cancels a conflict state and advances the processing to step S905.

In step S904, the setting management unit 455 stores the print setting on which the changing operation is performed, and reflects the print setting on the print setting. In step S905, the UI control unit 452 receives a print execution instruction. The print execution instruction is provided, for example, by selecting the output start button 509 print execution.

In step S906, the image management unit 454 executes the RIP processing on PDL data to generate image data. If the setting value of the copy number printing function 1 of the printing control apparatus 102 is enabled in the print setting, based on the setting items 505 to 508, the image management unit 454 combines an image for identifying the copy number with the image data used for printing.

In step S907, the job management unit 453 transmits print data including the image data acquired by executing the RIP processing and the print setting to the printing apparatus 101.

In the above-described present exemplary embodiment, a case is cited where the printing control apparatus 102 determines whether print settings conflict with each other at a timing when the operation for changing the print setting is received and executes control for preventing the store-in-box function and the copy number printing function 1 from being set simultaneously. However, a timing of placing a restriction is not limited thereto.

For example, after the user completes a series of print settings through the processing in step S901 and provides a printing start instruction in step S905, the printing control apparatus 102 may determine whether there are print settings conflicting with each other in step S902. In this case, the processing proceeds to step S906 and subsequent steps in a case where it is determined that there is no conflicting print setting through the above determination. In a case where it is determined that there are conflicting print settings, execution of the job is cancelled. In a case where the execution of the job is cancelled, the user may be notified of a reason of cancellation.

The printing apparatus 101 receives the print data transmitted in step S907 via the video cable 107 and the LAN cable 108, and processes the print data. If the box is set as the output destination of the print data, the received print data is stored in any one of the box areas 303 to 306 in FIG. 3. On the other hand, if the printer is set as the output destination of the print data, printing based on the print data is executed.

Lastly, a printing method of data stored in the box will be described. FIG. 15 is a diagram illustrating an example of an operation screen relating to box printing displayed on the operation unit 104 of the printing apparatus 101 according to the present exemplary embodiment. A list of print data stored in the box area is displayed on a job list screen 1500. In this example, a box 00 corresponding to the box area 303 is selected. Through the job list screen 1500 in FIG. 15, the user can change a print setting of the print data stored in the box or an input a printing instruction of the selected print data. A job list 1501 is a list of print data stored in the box area 303. A job name of the print data, the number of copies of the print data, and a time when the print data is stored in the box are displayed in the job list 1501. The user can change a detailed setting relating to duplication of desired print data and the copy number printing function 2 by selecting a checkbox 1502.

If pieces of print data stored in the box area 303 do not fit within a display area of the job list 1501, the user can scroll the display area up and down by using a scroll key 1503 to shift the displayed job list. A checkbox 1504 is a checkbox for selecting all of the print data. The user can collectively select all of the print data included in the job list 1501 by selecting the checkbox 1504. A button 1505 is used for changing a setting of the copy number printing function 2 provided by the printing apparatus 101. By selecting the button 1505, the user can make a detailed setting of the copy number printing function 2 with respect to the print data selected by the checkbox 1502. A button 1506 is used for changing the number of copies, and the number of copies to be printed can be changed thereby. A button 1507 is used for executing duplication. The user can duplicate the print data selected by the checkbox 1502 by pressing the button 1507. Duplication is performed when selected print data is copied or moved to another box area. A button 1508 is a print execution button if selection of the print execution button 1508 is detected, the printing apparatus 101 starts printing based on the selected print data.

Figure 16:
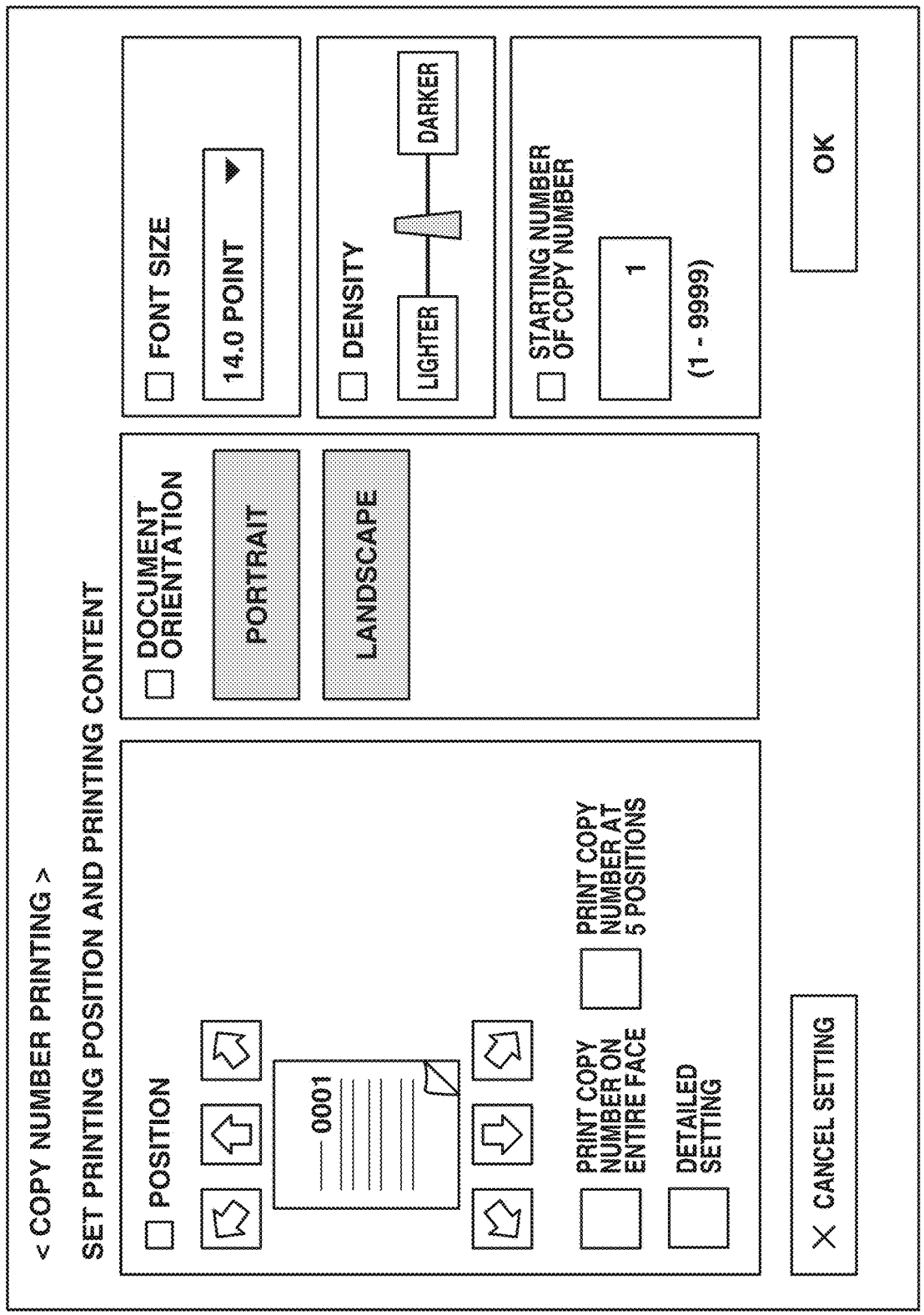
FIG. 16 is a diagram illustrating an example of a screen displayed on the operation unit of the printing apparatus.

If selection of the button 1505 is detected, the CPU 201 shifts the screen displayed on the operation unit 104 to a detailed setting screen as illustrated in FIG. 16. The user can make a detailed setting of the copy number printing through the screen in FIG. 16. For example, the user can set a printing position, a printing angle of the copy number, a font size, a printing density, and a starting number of the copy number. If selection of the OK button in FIG. 16 is detected, the printing apparatus 101 stores content set on the setting screen in association with the selected print data.

As described above, in the present exemplary embodiment, when copy number printing is implemented through image generation by the printing control apparatus 102, it is possible to place a restriction that prevents print data including the same content and having the same copy number from being transmitted to the printing apparatus 101. Accordingly, it is possible to prevent printed materials of the same content having the same copy number from being output. Further, in a case where the copy number printing function 2, which is the copy number printing function provided by the apparatus, is used, the data can be stored in the box area of the printing apparatus 101 without a restriction. In this case, the user can flexibly change the setting of the copy number printing function 2 via the operation unit 104 of the printing apparatus 101 to perform printing. As described above, since the user is allowed to use a combination of the copy number printing function 2 and the saving box, convenience of the user can be improved.

In the first exemplary embodiment, by placing a restriction that prohibits a combination of the copy number printing function 1 and the store-in-box function, it is possible to prevent printed materials of the same content having the same copy number from being output. However, even in a case where the copy number is combined with print data by the controller, there may be a case where the user desires to temporarily store the print data in the box of the printing apparatus 101.

In consideration of the above case, in a second exemplary embodiment, a user is allowed to store print data with a copy number in a box, and the printing apparatus 101 prevents printed materials of the same content having the same copy number from being output. In the second exemplary embodiment, a hardware configuration and a software configuration of the apparatus as prerequisites are similar to those of the apparatus according to the first exemplary embodiment. Thus, detailed descriptions will be omitted with respect to the configurations similar to those of the first exemplary embodiment.

FIG. 10 is a diagram illustrating an example of an operation screen relating to box printing displayed on the operation unit 104 of the printing apparatus 101 according to the present exemplary embodiment. A list of print data stored in the box area is displayed on a screen in FIG. 10. In this example, a box 00 corresponding to the box area 303 is selected.

On the screen in FIG. 10, the user can change a print setting of the print data stored in the box or can execute printing of the print data. Descriptions of content and setting items displayed thereon similar to those described in FIG. 15 of the first exemplary embodiment will be omitted, and a difference will be described. For convenience of description, a case is cited where "job1.pdf" in the list represents print data stored in the box of the printing apparatus 101 after the printing control apparatus 102 combines an image illustrating a copy number with the print data based on the copy number printing function 1. A copy number printing mark 1000 is displayed in a case where the copy number is added to the print data by the printing control apparatus 102.

If the print data having the copy number printing mark 1000 is selected by the user, the printing apparatus 101 grays out a button 1006 for changing the number of copies and a duplicate button 1007. The grayed out buttons are configured so that settings thereof cannot be changed even if a user operation is performed thereon.

A button 1008 is a print execution button. If the printing apparatus 101 detects that the print execution button 1008 is selected by the user, the printing apparatus 101 starts printing the selected print data. In the present exemplary embodiment, if print processing of the print data having the copy number printing mark 1000 is completed, the print data is automatically deleted from the box. As described above, in the present exemplary embodiment, the user is not allowed to change the number of copies, duplicate, or reprint the print data to which the copy number is set.

Figure 11:
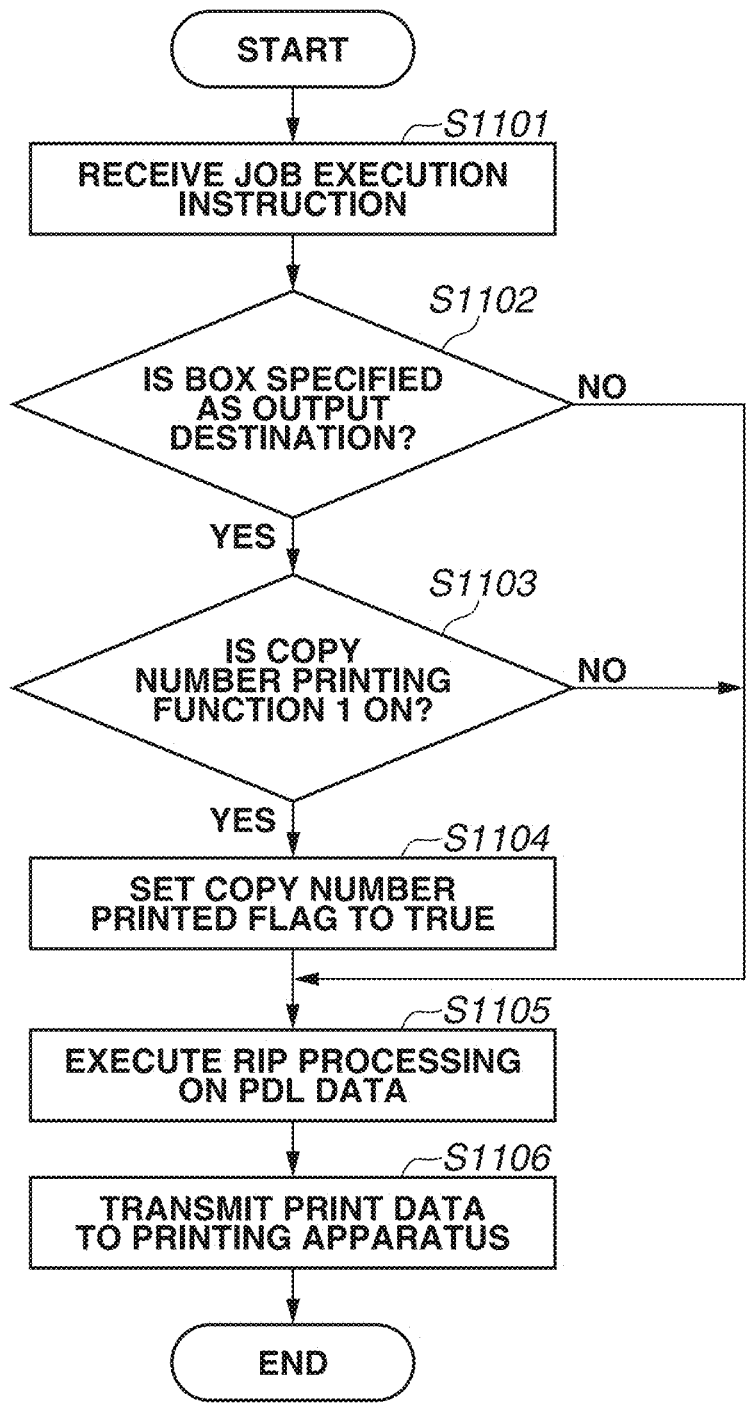
FIG. 11 is a flowchart illustrating an example of control executed by a printing control apparatus according to a second exemplary embodiment.
Figure 12A:
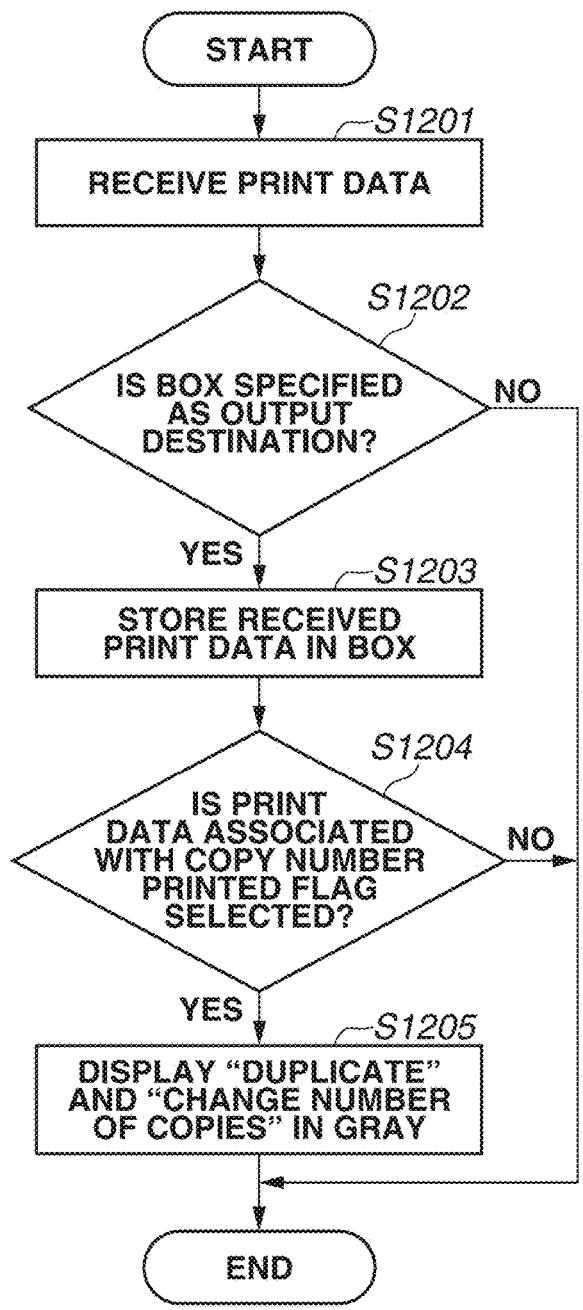
FIGS. 12A and 12B are flowcharts illustrating examples of control executed by printing apparatus according to the second exemplary embodiment.
Figure 12B:
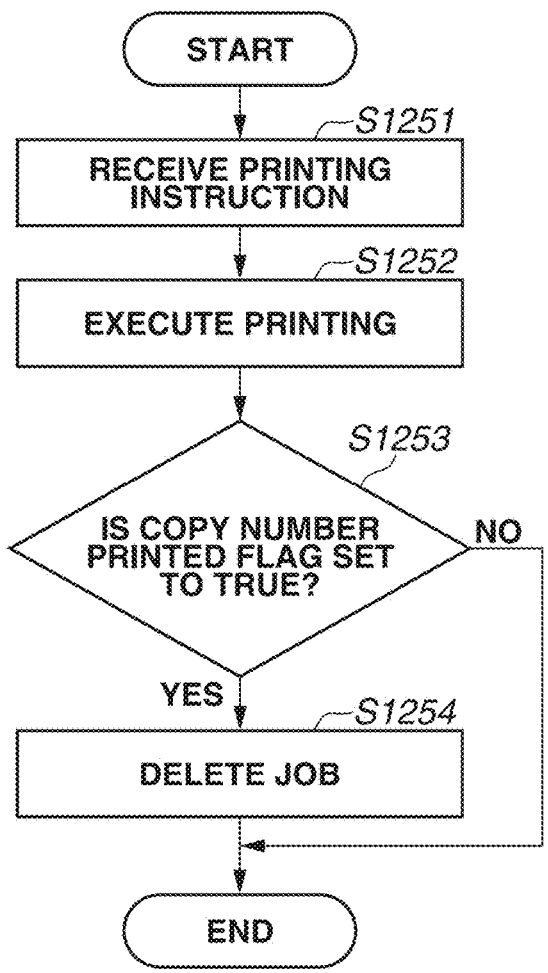

A specific control method will be described with reference to flowcharts in FIGS. 11, 12A, and 12B. FIG. 11 is a flowchart illustrating an example of print setting control executed by the printing control apparatus 102 according to the present exemplary embodiment. FIGS. 12A and 12B are flowcharts illustrating examples of printing control executed by the printing apparatus 101. Processing illustrated in the flowchart in FIG. 11 is implemented by the CPU 401 reading out a program of each software component stored in the external storage apparatus 409 to the RAM 402 and executing the program. Hereinafter, to clarify the component that executes the processing, the processing will be described by using a name of the component as a subject.

In step S1101, the UI control unit 452 receives an execution instruction of the print job. For example, the execution instruction is a user operation for selecting the print execution button 1008.

In step S1102, the setting management unit 455 determines whether a box is specified as the output destination 602 included in the print setting. If the box is specified (YES in step S1102), the processing proceeds to step S1103. If the box is not specified (NO in step S1102), the processing proceeds to step S1105.

In step S1103, the setting management unit 455 determines whether a setting value of the copy number printing function 1 included in the print setting is set to ON (enabled). If the setting value is set to ON (YES in step S1103), the processing proceeds to step S1104. If the setting value is not set to ON (i.e., if the setting value is set to OFF), (NO in step S1103), the processing proceeds to step S1105. Order of executing determinations in steps S1102 and S1103 is merely an example, and the determinations may be executed in reverse order.

In step S1104, the setting management unit 455 sets a copy number printed flag to TRUE. The copy number printed flag indicates a setting value added to a job so that the printing apparatus 101 can determine whether the job is the print data to which the copy number has been added by the controller. If a determination result in step S1102 or S1103 is NO, FALSE is set to the copy number printed flag. Specific usage will be described below with reference to FIGS. 12A and 12B.

In step S1105, the image management unit 454 executes the RIP processing on the print data (PDL data) to which the execution instruction has been provided in step S1101, to generate image data that can be output by the printing apparatus 101. If the setting 504 for the copy number printing function 1 is enabled, the image management unit 454 executes the RIP processing after superimposing an object illustrating a character string of the copy number on the PDL data to be printed, and generates image data including the character string of the copy number. In step S1106, the job management unit 453 generates print data (print job) including the image data generated in step S1105 and the print setting in cooperation with the network control unit 451, and transmits the print data to the printing apparatus 101.

Next, control processing for receiving the print data executed by the printing apparatus 101 will be described with reference to FIGS. 12A and 12B. Processing illustrated in the flowcharts in FIGS. 12A and 12B are implemented by the CPU 201 reading out a program of each software component stored in the external storage apparatus 213 to the RAM 202 and executing the program. Hereinafter, to clarify the component that executes the processing, the processing will be described by using a name of the component as a subject. FIG. 12A is a flowchart illustrating an example of the control processing relating to receiving of print data. FIG. 12B is a flowchart illustrating an example of the control processing relating to printing of the print data stored in a box through the processing in FIG. 12A.

In step S1201, the CPU 201 receives print data including image data and a print setting used for printing the image data.

In step S1202, the job management unit 254 determines whether a box is specified as the output destination of the print data received in step S1201. If the box is specified (YES in step S1202), the processing proceeds to step S1203. If the box is not specified (NO in step S1202), a series of the processing illustrated in this flowchart is ended. In this case, printing is executed based on the received print data without storing the print data in the box.

In step S1203, the job management unit 254 stores the received print data in the box area. More specifically, the job management unit 254 stores the print data received in step S1201 in any one of the box areas 303 to 306 in FIG. 3 corresponding to the box selected by the box selection 603 in FIG. 6.

Next, display control of a job list screen executed in steps S1204 and S1205 will be described. The job list screen is displayed when the printing apparatus 101 receives a user operation for using the box printing function (not illustrated) in FIG. 12A.

In step S1204, the UI control unit 252 determines whether a user operation for selecting the print data associated with the copy number printed flag is received. If the user operation is received (YES in step S1204), the processing proceeds to step S1205. If the user operation is not received (NO in step S1204), the UI control unit 252 ends the series of processing without executing restriction processing.

In step S1205, as illustrated in FIG. 10, the UI control unit 252 changes the state of the buttons 1006 and 1007 for changing the number of copies and for executing duplication, respectively, to the grayed-out state. Through the processing, it is possible to prohibit changing of the number of copies of the print data or duplicating of the print data with which the copy number image has been combined by the copy number printing function 1 provided by the controller.

Next, with reference to FIG. 12B, control processing for printing the print data stored in the box through the processing in FIG. 12A will be described.

In step S1251, the image management unit 255 detects that the print execution button 1008 has been selected. Then, in step S1252, in cooperation with the printing unit 214, the printing control unit 253 prints an image based on the selected print data on a sheet.

In step S1253, the job management unit 254 determines whether the copy number printed flag is set to TRUE. If the copy number printed flag is set to TRUE (YES in step S1253), the processing proceeds to step S1254. If the copy number printed flag is not set to TRUE (i.e., if the flag is set to FALSE), (NO in step S1253), a series of box printing processing is ended.

In step S1254, the UI control unit 252 deletes the data that has already been printed in step S1252 from the box area.

Through the above-described processing, while the user is allowed to store the print data with which the copy number has been combined by the controller in the box, it is possible to prevent printed materials of the same content having the same copy number from being output.

In the second exemplary embodiment, while the user is allowed to store the print data with which the copy number has been combined by the copy number printing function 1 in the box, duplicating of the print data and changing of the number of copies are prohibited by the printing apparatus 101. However, there is also a case where the user desires to change the number of copies or to execute reprinting of the print data having the copy number stored in the box. In consideration of the above case, in a third exemplary embodiment, while the user is allowed to reprint the print data having the copy number stored in the box or to change the number of copies thereof, it is possible to prevent printed materials of the same content having the same identification information printed thereon from being output. In the third exemplary embodiment, a hardware configuration and a software configuration of the apparatus as prerequisites are similar to those of the apparatus according to the second exemplary embodiment. Thus, detailed descriptions will be omitted with respect to the configurations similar to those of the first and the second exemplary embodiments.

Figure 13A:
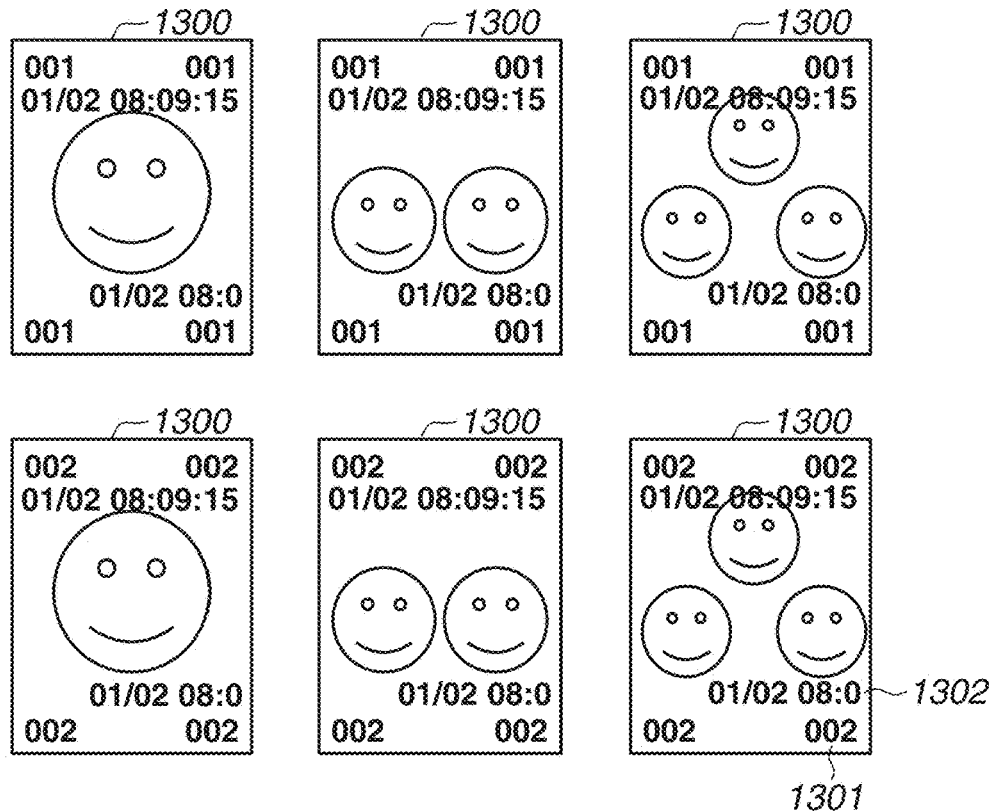
FIGS. 13A and 13B are diagrams illustrating examples of an output material on which an image of a copy number and identification information are printed.
Figure 13B:
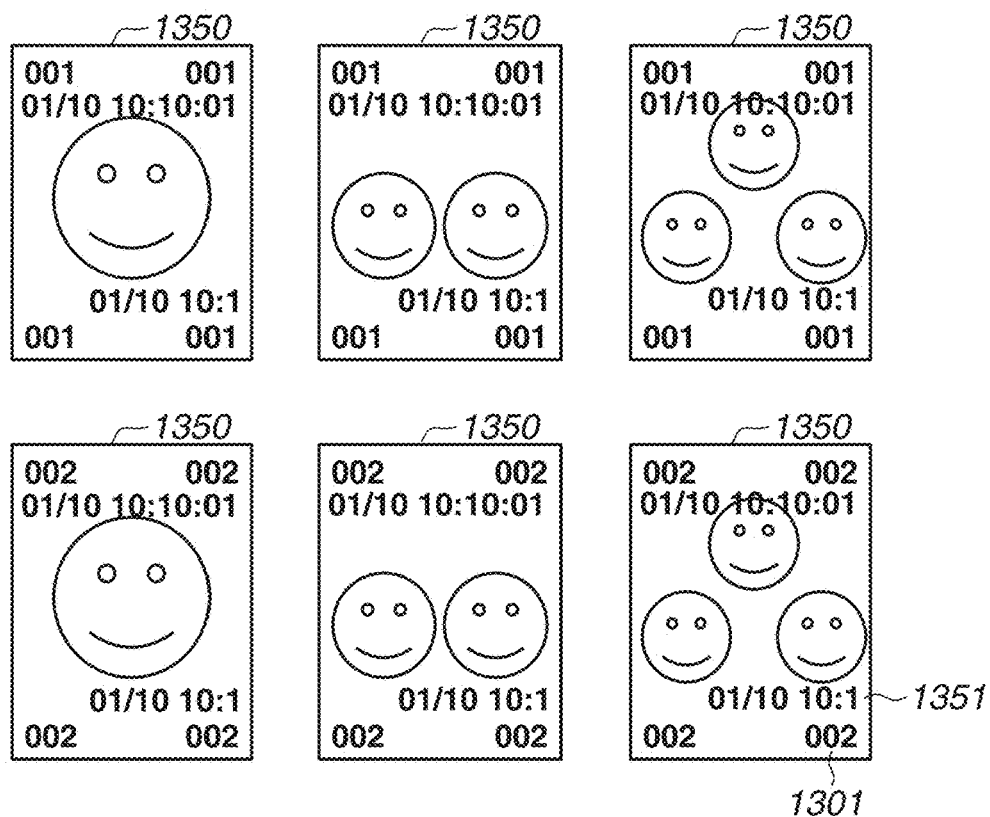

FIGS. 13A and 13B are diagrams illustrating examples of printing results of a copy number printing job according to the present exemplary embodiment. Each of printed materials 1300 in FIG. 13A illustrate a printing result of the job based on a first printing instruction, and each of printed materials 1350 in FIG. 13B illustrate a printing result of print data stored in the box based on a second printing instruction.

A character string 1301 represents a copy number. A date and time 1302 is printed based on date and time information acquired at a timing when the print execution button 1008 is selected. A rendering object illustrating a character string of the date and time 1302 is combined with the content of the printed material 1300 by the printing apparatus 101. The printing apparatus 101 generates the rendering object illustrating the character string of the date and time 1302. Subsequently, the printing apparatus 101 superimposes the rendering object illustrating the character string of the date and time 1302 on the PDL data, and executes the RIP processing thereon.

A date and time 1351 represents a date and time of the printed materials 1350 printed based on the second printing instruction. The date and time 1351 is an identification image based on date and time information acquired at a timing when the user selects the print data corresponding to the printed materials 1350 again and selects the print execution button 1008. As described above, by additionally printing the date and time information acquired at a timing when the print execution instruction is received, it is possible to prevent printed materials of the same content having the same identification information from being output when reprinting is executed. In the present exemplary embodiment, a case is cited where the date and time when the print execution button is pressed is printed as the date and time information. However, the date and time information is not limited thereto. For example, the date and time information may be a job generation date and time.

Figure 14:
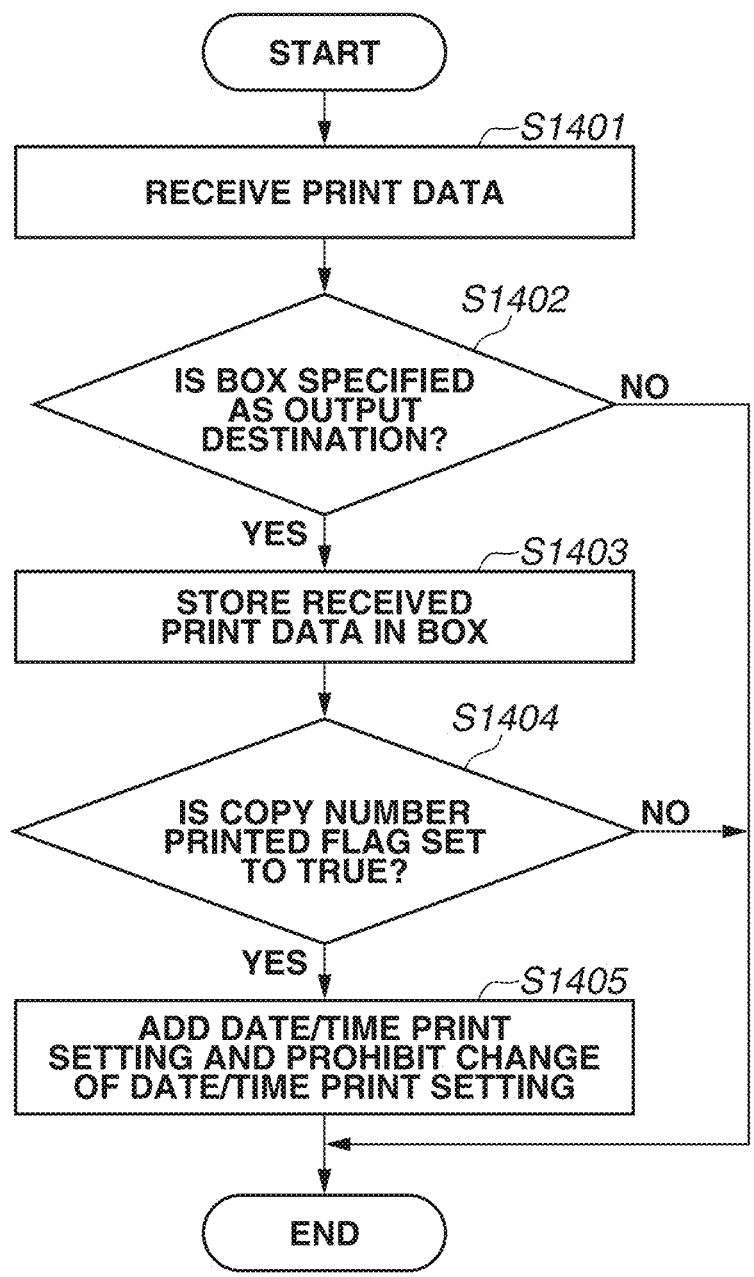
FIG. 14 is a flowchart illustrating an example of control executed by the printing apparatus according to a third exemplary embodiment.

A specific control method will be described with reference to flowcharts in FIG. 14. Processing illustrated in the flowchart in FIG. 14 is implemented by the CPU 201 reading out a program of each software component stored in the external storage apparatus 213 to the RAM 202 and executing the program. Hereinafter, to clarify the component that executes the processing, the processing will be described by using a name of the component as a subject.

In step S1401, the CPU 201 receives print data including image data and a print setting with respect to the image data from the printing control apparatus 102 via the video cable 107 and the LAN cable 108.

In step S1402, the job management unit 254 determines whether a box is specified as the output destination of the print data received in step S1401. If the box is specified (YES in step S1402), the processing proceeds to step S1403. If the box is not specified (i.e., if a printer is specified) (NO in step S1402), a series of the processing is ended.

In step S1403, the job management unit 254 stores the received job in the box.

In step S1404, the setting management unit 256 determines whether the copy number printed flag of the print data stored in the box is set to TRUE. If the copy number printed flag is set to TRUE (YES in step S1404), the processing proceeds to step S1405. If the copy number printed flag is not set to TRUE (i.e., if the flag is set to FALSE), (NO in step S1404), the series of processing is ended. In step S1405, the setting management unit 256 adds setting of a date and time printing function to the print setting corresponding to the print data stored in step S1403. Further, in order to prevent the setting of the date and time printing function from being changed, the setting management unit 256 adds a flag for prohibiting changing of the setting, and ends the series of processing.

Through the above-described processing, if image data with which the copy number has been combined by the copy number printing function 1 is to be printed, printed materials on which the date and time information is superimposed are output consistently. In addition, in a case where the setting of the number of copies is changed to a plurality of copies via a setting screen of the box printing when the copy number printed flag is set, the printing apparatus 101 further executes the following control. At a timing when printing of the first copy is completed, the printing apparatus 101 updates the date and time information used for printing of the date and time information. Through the processing, the date and time information printed on the second copy can be different from that of the first copy. Thus, it is possible to prevent the printed materials of the same content having the same identification information printed thereon from being output.

In the present exemplary embodiment, the date and time is printed as the identification information; however, the identification information is not limited thereto. Since the identification information is added to prevent output of printed materials of the same content having the same copy number, any information can be added as long as an effect of uniquely identifying each of the printed materials can be expected therefrom. For example, a pseudo-random number may be added thereto.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-226781, filed Dec. 3, 2018, which is hereby incorporated by reference herein in its entirety.

What is claimed is:

1. A printing control apparatus to transmit, to a printing apparatus, print data including image data, the printing control apparatus comprising:

one or more processors configured to perform operations including:
  displaying on a display a user interface configured to receive input from a user to enable print setting for the image data to be transmitted to the printing apparatus, wherein the user interface allows the user to enable a first setting for combining a print copy number with the image data, and to enable a second setting for storing in the printing apparatus in a re-printable state, and
  performing control such that the first setting and the second setting are not both enabled.

2. The printing control apparatus according to claim 1, wherein performing control includes performing control to prevent a combination of the first setting and the second setting from being set to the print setting.

3. The printing control apparatus according to claim 1, wherein, after a printing instruction is received, performing control includes (i) determining whether a combination of the first setting and the second setting is set to the print setting with respect to the image data, (ii) controlling the printing control apparatus to generate and transmit the print data based on the printing instruction when it is determined that the first setting and the second setting are not combined with each other, and (iii) controlling the printing control apparatus to cancel generation of print data based on the printing instruction when it is determined that the first setting and the second setting are combined with each other.

4. The printing control apparatus according to claim 1, wherein performing control includes not specifying a combination of a third setting indicating that predetermined identification information is combined with the image data when printing is executed by the printing apparatus and the second setting as a target of a restriction that prevents the print data and the second setting from being transmitted to the printing apparatus.

5. The printing control apparatus according to claim 4, wherein performing control includes not generating a print job based on the first setting and the third setting.

6. The printing control apparatus according to claim 1,
  wherein the operations further include storing a conflict rule indicating a combination of print settings conflicting with each other, and
  wherein, in performing control to place a restriction that prevents the print data from being transmitted to the printing apparatus, the restriction is placed based on the stored conflict rule.

7. The printing control apparatus according to claim 1, wherein, in a case where performing control further includes generating image data, the first setting is a value that enables a function of combining information indicating a copy number for identifying each copy with the generated image data.

8. The printing control apparatus according to claim 1, wherein performing control includes displaying a message to indicate that the first setting and the second setting are not both enabled on the user interface.

9. The printing control apparatus according to claim 1, wherein performing control includes disabling one of the first setting and the second setting.

10. The printing control apparatus according to claim 9, wherein performing control includes cancelling to prevent the same print copy number from being printed in a plurality of times.

11. The printing control apparatus according to claim 1,
  wherein displaying on the display includes displaying another user interface for receiving the first setting for combining a print copy number with the image data in the printing control apparatus and for receiving a third setting for combining a print copy number with the image data in the printing apparatus, and
  wherein performing control includes performing another control such that the first setting and the second setting are not both enabled.

12. A non-transitory computer-readable storage medium storing a program to cause a computer to perform a method for transmitting, to a printing apparatus, print data including image data, the method comprising:
  displaying on a display a user interface configured to receive input from a user to enable print setting for the image data to be transmitted to the printing apparatus, wherein the user interface allows the user to enable a first setting for combining a print copy number with the image data, and to enable a second setting for storing in the printing apparatus in a re-printable state; and
  performing control such that the first setting and the second setting are not both enabled.

13. A printing control apparatus to transmit, to a printing apparatus, print data including image data, the printing control apparatus comprising:
  one or more processors configured to perform operations including:
  displaying on a display a first setting for combining a print copy number with the image data, and a second setting for storing in the printing apparatus in a re-printable state,
  receive a first user instruction to enable the first setting,
  receive a second user instruction to enable the second setting, and
  performing control such that the first setting and the second setting are not both enabled.

14. The printing control apparatus according to claim 13, wherein performing control includes displaying a message to indicate that the first setting and the second setting are not both enabled on the user interface.

15. The printing control apparatus according to claim 13, wherein performing control includes disabling one of the first setting and the second setting.

16. The printing control apparatus according to claim 15, wherein performing control includes cancelling to prevent the same print copy number from being printed in a plurality of times.

17. The printing control apparatus according to claim 13,
  wherein displaying on the display includes displaying another user interface for receiving the first setting for combining a print copy number with the image data in the printing control apparatus and for receiving a third setting for combining a print copy number with the image data in the printing apparatus, and
  wherein performing control includes performing another control such that the first setting and the second setting are not both enabled.

* * * * *